United States Patent
Maurer et al.

(10) Patent No.: US 9,862,033 B2
(45) Date of Patent: Jan. 9, 2018

(54) INDEXING CHUCK

(71) Applicant: SMW-AUTOBLOK SPANNSYSTEME GmbH, Meckenbeuren (DE)

(72) Inventors: Eckhard Maurer, Oberteuringen (DE); Harald Deininger, Friedrichshafen (DE)

(73) Assignee: SMW—AUTOBLOK SPANNSYSTEME GmbH, Meckenbeuren (DE)

( * ) Notice: Subject to any disclaimer, the term of this patent is extended or adjusted under 35 U.S.C. 154(b) by 87 days.

(21) Appl. No.: 14/768,807

(22) PCT Filed: Feb. 7, 2014

(86) PCT No.: PCT/EP2014/052452
§ 371 (c)(1),
(2) Date: Aug. 19, 2015

(87) PCT Pub. No.: WO2014/128014
PCT Pub. Date: Aug. 28, 2014

(65) Prior Publication Data
US 2016/0001376 A1      Jan. 7, 2016

(30) Foreign Application Priority Data
Feb. 19, 2013  (EP) .................................. 13155700

(51) Int. Cl.
*B23B 31/34*      (2006.01)
*B23B 31/177*     (2006.01)

(52) U.S. Cl.
CPC ........ *B23B 31/34* (2013.01); *B23B 31/16254* (2013.01); *B23B 2215/68* (2013.01);
(Continued)

(58) Field of Classification Search
CPC ........ B23B 31/16179; B23B 31/16254; B23B 31/34; Y10T 279/1291; Y10T 279/13; Y10T 279/17743
See application file for complete search history.

(56) References Cited

U.S. PATENT DOCUMENTS

| | | | | |
|---|---|---|---|---|
| 1,783,989 A | * | 12/1930 | Wetmore | ............... B23B 31/34 279/5 |
| 1,788,458 A | * | 1/1931 | Garno | ................... B23B 31/34 279/137 |

(Continued)

FOREIGN PATENT DOCUMENTS

| | | | |
|---|---|---|---|
| DE | 1214974 | 4/1966 | |
| DE | 2855964 A1 | * 7/1980 | ....... B23B 31/16287 |

(Continued)

*Primary Examiner* — Eric A Gates
(74) *Attorney, Agent, or Firm* — Pandiscio & Pandiscio (57) ABSTRACT

The invention relates to an indexing chuck comprising a chuck body having an opening; a pivoting ring disposed in the opening, the pivoting ring having at least three clamping jaws that can be advanced radially, perpendicular to the longitudinal axis of the chuck body; an advancing device which is disposed in the pivoting ring and by means of which the clamping jaws can be moved synchronously; and two pivot pins, supported in the chuck body and forming a pivot axis, wherein the advancing device comprises a synchronizing ring which is movable relative to the pivoting ring, a driving surface extending at an angle to the longitudinal axis of the chuck body where it contacts a clamping jaw, and a contact surface on the respective clamping jaw which interacts with the driving surface of the synchronizing ring such that the clamping jaws are moved radially.

11 Claims, 8 Drawing Sheets

(52) U.S. Cl.
CPC ..... *B23B 2215/72* (2013.01); *Y10T 279/1291* (2015.01); *Y10T 279/13* (2015.01); *Y10T 279/17743* (2015.01)

(56) References Cited

U.S. PATENT DOCUMENTS

| | | | | |
|---|---|---|---|---|
| 2,480,715 A * | 8/1949 | De Graff | ........... | B23B 31/16204 279/5 |
| 2,732,216 A * | 1/1956 | Sloan et al. | ...... | B23B 31/16204 279/118 |
| 2,972,487 A * | 2/1961 | Blackburn | ........ | B23B 31/16241 279/5 |
| 2,980,432 A | 4/1961 | Benson | | |
| 3,081,103 A * | 3/1963 | Renoux | ............. | B23B 31/16287 279/4.11 |
| 3,083,024 A * | 3/1963 | Herbkersman | ... | B23B 31/16179 279/4.12 |
| 3,790,181 A * | 2/1974 | Scharfen | ........... | B23B 31/16287 279/4.11 |
| 3,879,045 A * | 4/1975 | Benjamin | ......... | B23B 31/16287 279/5 |
| 4,209,181 A * | 6/1980 | Morawski | ............... | B23B 31/34 279/5 |
| 4,411,440 A * | 10/1983 | Becker | .............. | B23B 31/16254 279/137 |
| 4,548,417 A * | 10/1985 | Glommen | ............... | B23B 31/34 279/114 |
| 4,730,837 A * | 3/1988 | Rohm | ..................... | B23B 31/34 279/5 |
| 4,747,609 A * | 5/1988 | Scharfen | ................. | B23B 31/34 279/121 |
| 4,811,963 A | 3/1989 | Bronzino et al. | | |
| 5,257,883 A * | 11/1993 | Armando | ................ | B23B 31/34 409/201 |
| 8,087,675 B2 * | 1/2012 | Korson | ................ | B23B 31/003 279/121 |
| 2003/0011146 A1 | 1/2003 | Wu | | |

FOREIGN PATENT DOCUMENTS

| | | | | |
|---|---|---|---|---|
| DE | 3230135 A1 * | 2/1984 | ....... | B23B 31/16204 |
| EP | 0258557 | 3/1988 | | |
| GB | 2015391 | 9/1979 | | |

* cited by examiner

Figur 1

Figur 2

Figur 3

Figur 4a

Figur 4b

Figur 5a

Figur 5b

Figur 6

INDEXING CHUCK

REFERENCE TO PENDING PRIOR PATENT APPLICATIONS

This patent application claims benefit of International (PCT) Patent Application No. PCT/EP2014/052452, filed 7 Feb. 2014 by SMW-AUTOBLOK SPANNSYSTEME GmbH for INDEXING CHUCK, which claims benefit of European Patent Application No. EP 13155700.1, filed 19 Feb. 2013, which patent applications are hereby incorporated herein by reference.

FIELD OF THE INVENTION

The present invention relates to an indexing chuck.

BACKGROUND OF THE INVENTION

Chucks have been familiar for decades and are used, amongst other purposes, for holding sleeves, i.e. rotationally symmetrical workpieces, in a fixed location on machine tools so that an internal thread can be worked into them, the sleeves being subsequently used as connection and sealing elements in gas or oil pipelines. The internal threads to be manufactured are self-sealing, which means that the production of such threads requires a high level of precision.

The larger the external diameter that is to be selected for such sleeves, the larger the internal diameter with which a chuck body of the chuck must be configured in order to be able to accommodate the workpiece that is to be machined. Furthermore, it is necessary for the internal thread to be worked into the inner wall at both open ends of the sleeve, meaning that the sleeve must be swiveled through 180° following the machining of the first internal thread.

It has also been disclosed, for example in the publications DE 1 214 974 B or GB 2,015,391 A, that two or more clamping jaws are to be provided for clamping the sleeve, by means of which the sleeve is positioned centrally in relation to the longitudinal axis of the chuck once the clamping jaws have been advanced. The precision of machining largely depends on the centring of the sleeve in relation to its longitudinal axis, which is aligned flush with the longitudinal axis of the machine tool.

In what are referred to as two-jaw indexing chucks, it has proved to be a disadvantage that the positioning of the workpiece to be machined is extremely difficult to accomplish, because the lower clamping jaw in the direction of the force of gravity is fixedly supported in the chuck body or on a pivoting ring articulated in a rotating arrangement on the chuck body, with the effect that it is impossible to regulate the height of this clamping jaw. Although the opposite clamping jaw can move radially in relation to the chuck body, it is not possible to lift the sleeve in the event that the centre of the sleeve is arranged below the longitudinal axis of the chuck body, meaning that the lower chuck jaw must subsequently be shimmed using discs, spacer plates and the like, the thickness of which must be adapted to the amount of deviation. Such adjustment measures are time-consuming and have to be repeated each time a new batch of sleeves is to be machined.

Although two-jaw indexing chucks are capable of accommodating sleeves with large internal diameters, and the sleeves can also be rotated through 180° within the chuck body, such two-jaw indexing chucks do suffer from the disadvantage that the machining forces that occur, which are in particular vectored perpendicular to the chucking direction, cannot be optimally supported, which means that the machining forces tend to push the sleeve out of the central position. Furthermore, the workpiece is compressed between two clamping jaws. The greater the chucking forces, the greater the risk that the workpiece could undergo elastic or even plastic deformation. This leads to machining errors or an unusable sleeve.

However, as soon as additional clamping jaws are provided in the area of the lateral or horizontal planes, such large sized sleeves can no longer be rotated, because these clamping jaws take up the space required for turning the sleeve.

If, consequently, several clamping jaws, for example three clamping jaws, are used, it is only possible to machine or clamp sleeves with smaller dimensions.

DE 1 214 974 discloses a two-jaw or multi-jaw chuck by means of which a wall thickness of the chuck body should be provided that is as even as possible. In particular, the radial advance of the clamping jaws, which must take place synchronously to achieve central clamping of the sleeve, is undertaken with the help of a hydraulic circuit by means of which a clamping piston allocated to each clamping jaw is moved axially in the pivoting ring, with the clamping piston making contact with one of the clamping jaws in such a way as to provide an active driving effect.

U.S. Pat. No. 4,811,963 discloses the design measures that allow the pivoting ring to be rotated through 180° in relation to the chuck body with a clamped sleeve. For this purpose, two axially movable racks are provided in the chuck body. The two racks run parallel to one another in one plane and act jointly on a drive gear that is in an active driving connection with one of the pivot pins of the pivoting ring. The two racks are moved in opposite directions to one another, and each stroke of the particular rack causes the drive gear to rotate, as a result of which the pivot pin is rotated.

As a result, the pivoting ring can exclusively be moved through 180°, because subsequently to that the racks are in their end position and must be pulled back to the initial position, with the effect that the pivoting ring is permanently rotated through 180°.

The already disclosed multi-jaw indexing chucks suffer from the disadvantage that their external diameter is at least 750 mm and internal diameter about 185 mm, so as to provide the necessary space for accommodating the racks; because chucks of this kind are to be attached to machine tools with a limited working space, these chucks of prior art take up a considerable amount of space that is no longer available for the working area.

In particular, if three clamping jaws and three compensating jaws ere to be provided so as to reduce the advance and chucking forces of three clamping jaws in such a way that the chucking forces acting on the surface of the workpiece do not deform or cause irreparable damage to the workpiece, but are instead arranged evenly, the internal diameter of the chuck is significantly reduced, with the effect that only workpieces with a small external diameter can be clamped.

Furthermore, the wall thickness of the chuck body in the area of the racks must be made large so as to provide sufficient space to accommodate the racks and corresponding advance elements. It is disadvantageous that chuck bodies of this kind are very large, with an external diameter of 760 mm and internal diameter of 160 mm, for example.

SUMMARY OF THE INVENTION

It is consequently the task of the present invention to develop a chuck of the aforementioned kind on which at least three clamping jaws are provided, by means of which the workpiece is centred and locked on the chuck body, and at the same time the external diameter of the chuck body is at most 400 mm with an internal diameter of about 180 mm, so as to reduce the space required by the chuck. Consequently, the chuck should have a compact design while being able to accommodate workpieces with the largest possible dimensions.

This task is accomplished by the provision and use of a novel indexing chuck, as will hereinafter be discussed in further detail.

Due to the attributes that the clamping axes of the clamping jaws are offset in relation to the pivot axis formed by the pivot pins, that the advance mechanism of the at least three clamping jaws is formed from one synchronising ring mounted in parallel to the longitudinal axis of the chuck body in the pivoting ring, that a driving surface is worked onto the synchronising ring in the area of the particular clamping jaw and runs at an angle in relation to the longitudinal axis of the chuck body and that a contact surface is provided on the particular clamping jaw which interacts with the driving surface of the synchronising ring in such a way that the clamping jaws are moved radially out of the pivoting ring, an extremely compact chuck is produced, because the components required for moving the clamping jaws and the driving elements provided for pivoting the pivoting ring are installed in a space-saving manner in the chuck body or in the pivoting ring. Consequently, the external diameter of the chuck body can be limited to about 400 mm with an internal diameter of about 180 mm. This results in a reduction of the structural space compared to the situation of prior art by almost 50% despite the internal diameter of the chuck body being approximately of equal size to that in state-of-the-art ring-type indexing chucks. As a result, sleeves or other rotationally symmetrical workpieces of almost the same size can be clamped in the chuck body and machined.

These design measures reduce the manufacturing costs of the chuck body, because it is possible to reduce significantly the amount of material required for manufacturing the chuck body. At the same time, the weight of the chuck body is also reduced by almost 50% compared to conventional chuck bodies.

The operating convenience of the previous chuck continues to be provided, because the clamping jaws can be advanced radially and evenly by means of the hydraulic or pneumatic control circuit and by the synchronising ring that is arranged inside the clamping ring in an axially movable arrangement, meaning that the workpiece to be clamped is aligned centrally with the longitudinal axis of the chuck body.

Furthermore, the chuck in accordance with the present invention offers the advantage that there is no need to stop the rotation of the chuck body or the pivoting ring during swiveling of the workpiece. Rather, the pivoting ring can be moved through 180° although the chuck body and thus also the pivoting ring are still rotating. As there is no need to deactivate the chuck body and the pivoting ring during the 180° rotation of the pivoting ring, there are shorter standstill times involved in machining of the workpiece. The pivoting of the pivoting ring during which the chuck body continues to rotate at, for example, half the circumferential velocity of the speed with which it rotates during the machining process, is accomplished in that the pivot pins which form the common pivot axis are in a continuous non-positive or positive active connection with the pivoting ring, which means that the latter is reliably locked against the chuck body. Also, applying the pivoting forces to the two pivot pins allows the pivoting ring to rotate about the longitudinal axis of the chuck body at the same time as being pivoted, because the forces act along the swiveling axis, as a result of which hardly any disruptive torques occur.

BRIEF DESCRIPTION OF THE DRAWINGS

The drawing shows a sample embodiment of an indexing chuck configured in accordance with the present invention, which is subsequently explained in detail. In the drawing.

DETAILED DESCRIPTION OF THE PREFERRED EMBODIMENT

Figure 1:
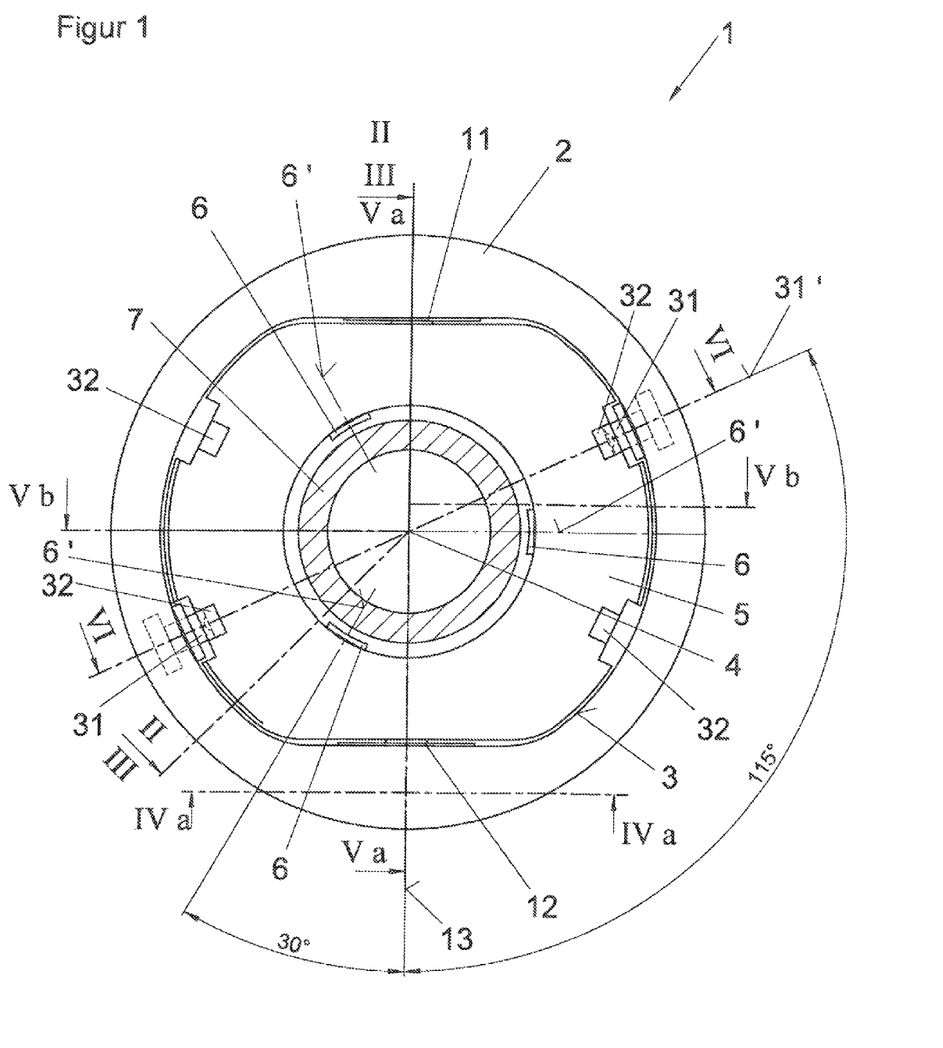
FIG. 1 shows an indexing chuck with a chuck body and a pivoting ring inserted within it, on which three clamping jaws are mounted in a manner which permits radial advance, as a top view.
Figure 2:
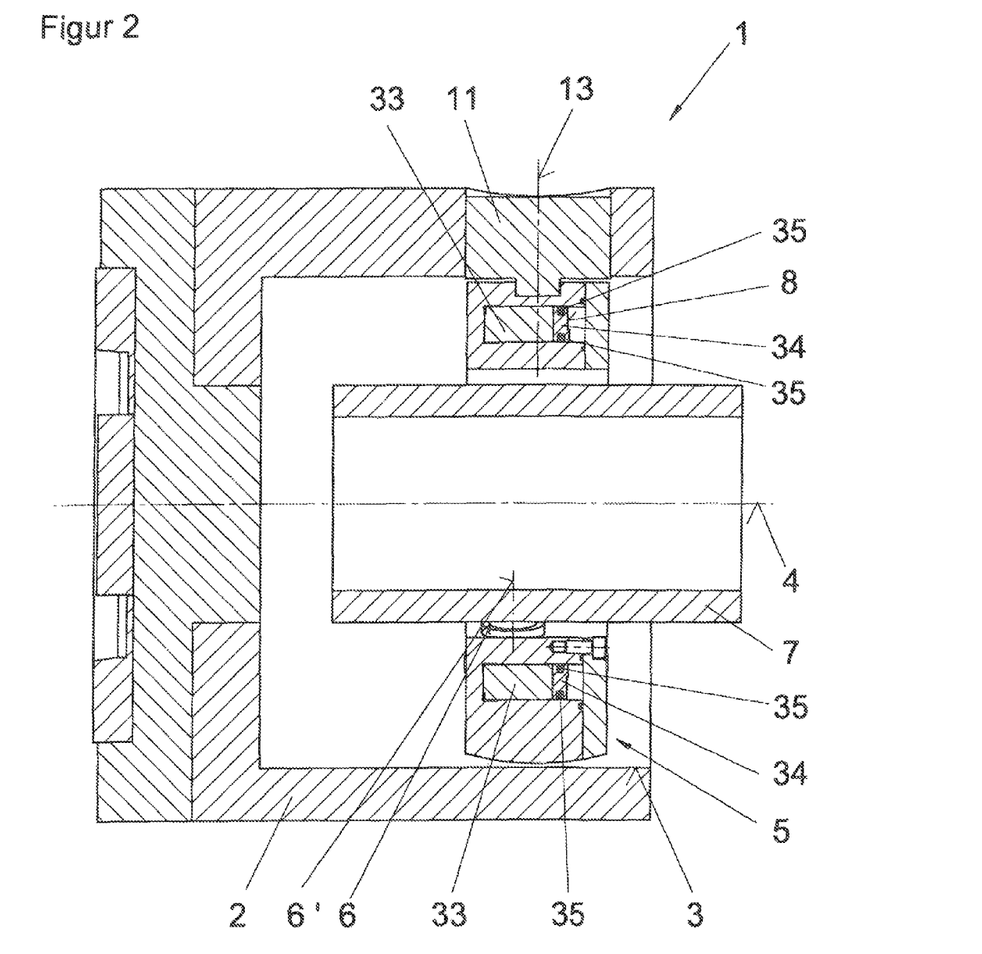
FIG. 2 shows the chuck according to FIG. 1 along the line II-II.

FIGS. 1 and 2 show an indexing chuck 1 by means of which a rotationally symmetrical workpiece 7, for example a sleeve, is held on a machine tool (not illustrated) in order to work an internal thread into the sleeve 7. Sleeves 7 such as this are usually used as connecting and sealing elements for pipe sections used for creating a gas or oil pipeline. The sleeves seven have a self-sealing internal thread, which means that the production of this thread requires a high level of precision. Consequently, the sleeves 7 must be aligned centrally with the longitudinal axis 4 of the machine tool, and thus with the longitudinal axis 4 of the chuck 1.

The chuck 1 consists of a chuck body 2 with an accommodating opening 3 worked centrally into the chuck body 2 in relation to its longitudinal axis. The accommodating opening 3 is largely adapted to the round external contour of the workpiece 7.

Furthermore, the accommodating opening 3 of the chuck body 2 has a pivoting ring 5 inserted into it which is in a driving connection with the chuck body 2. For the purpose of machining the workpiece 7, the chuck body 2 is rotated about its longitudinal axis 4; the rotation of the chuck body 2 is transferred to the pivoting ring 5, with the effect that there are no relative movements between the chuck body 2 and the pivoting ring 5 during the machining process.

For the purpose of locking the workpiece 7, the pivoting ring 5 has three clamping jaws 6 mounted in it which can be moved radially, and are advanced synchronously in the direction of the workpiece 7 by means of an advancing device 8. The three clamping jaws 6 consequently secure the workpiece 7 centrally in the pivoting ring 5.

In the present sample embodiment, three clamping jaws are arranged on the pivoting ring 5 which are spaced apart from one another at an angle of 120°. It is easily conceivable for more than three clamping jaws 6 to be attached to the pivoting ring 5, especially if the internal diameter of the accommodating opening 3 can be made larger.

Furthermore, the pivoting ring 5 in the accommodating opening 3 is to be pivoted through 180° relative to the chuck body 2, because the workpiece 7 needs to be machined from both open ends. Initially, namely, one part of the internal thread is worked into the inner wall of the workpiece 7 from a first open end and then, after the workpiece 7 has been pivoted through 180° using the pivoting ring 5 in the chuck body 2, an internal thread is worked into the second open end of the workpiece 7.

For the purpose of swiveling the pivoting ring 5, two pivot pins 11 and 12 are arranged in the chuck body 2 and project in the direction of the longitudinal axis 4 of the chuck body 2, forming a common pivot axis 13.

It is of particular significance for the invention that the clamping axes 6' formed by the three clamping jaws 6 run at a distance from the pivot axis 13. The angular distance between the pivot axis 13 and one of the clamping axes 6 is 30°. If, however, the pitch angle between the clamping axes 6 changes, because several clamping jaws are provided, this angular distance accordingly.

Figure 3:
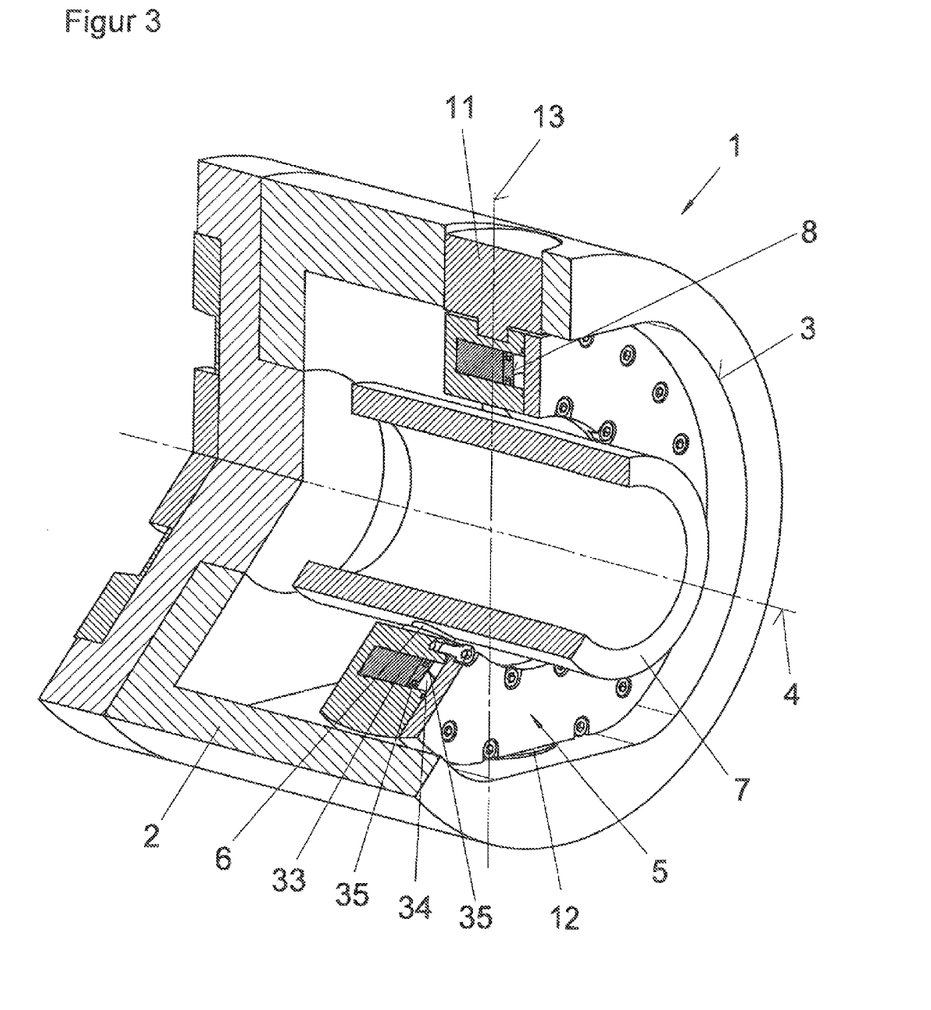
FIG. 3 shows the chuck according to FIG. 1 as a perspective view.
Figure 5A:
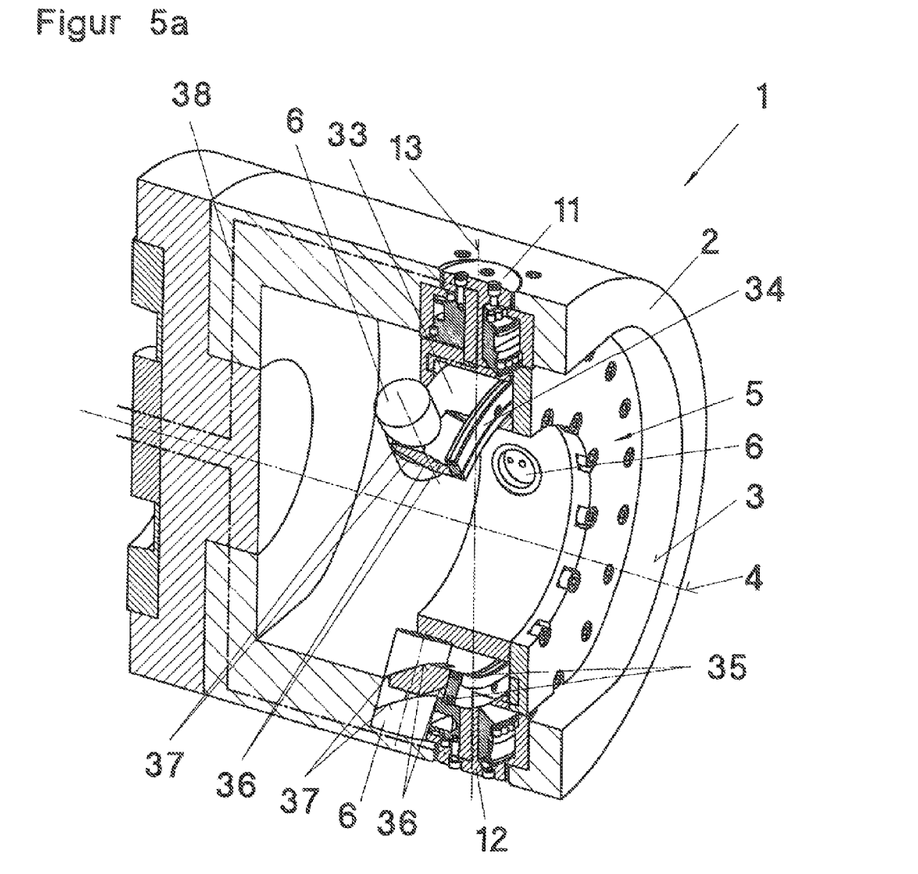
FIG. 5a shows the chuck according to FIG. 1 along the line Va-Va.

FIGS. 2 and 3 as well as 5a, moreover, show that the advancing device 8 installed in the pivoting ring 5 makes the radial movement of the particular clamping jaws 6 possible. The advancing device 8 encompasses a synchronising ring 33 and a cover 34 of the synchronising ring 33 that seals a hydraulic or pneumatic circuit 38 with the help of a seal 35. A pump installed in the hydraulic or pneumatic circuit 38 (not illustrated) pumps the delivery medium evenly from one side of the advancing device 8 to the opposite side of the advancing device 8, with the effect that the synchronising ring 33 is moved back and forth in parallel to the longitudinal axis 4 of the chuck body 2.

Figure 5B:
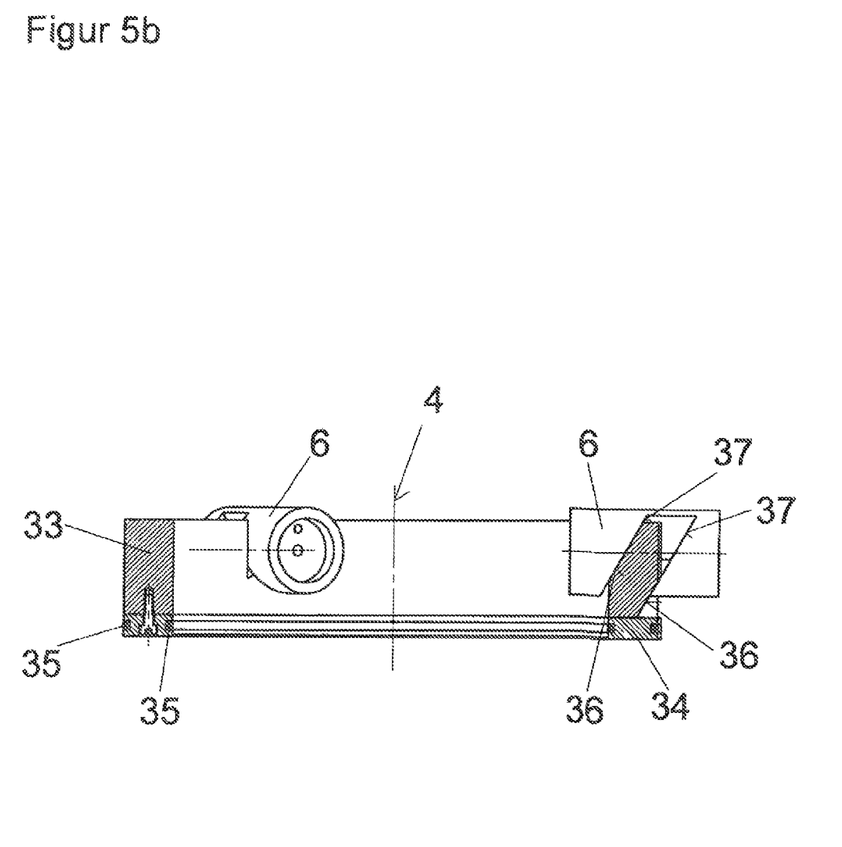
FIG. 5b shows the chuck according to FIG. 1 long the line Vb-Vb and FIG. 6 shows the chuck according FIG. 1 along the line VI-VI.

The three clamping jaws 6 are installed in the pivoting ring 5 in such a way that they are in a non-positive or positive active connection with the synchronising ring 33. FIGS. 5a and 5b in particular show that each synchronising ring 33 has a driving surface 36 worked onto it which runs at an angle and with which a contact surface 37 worked onto the particular clamping jaw 6 makes contact. As soon as the synchronising ring 33 is moved in the direction of the open end of the chuck body 2, the three clamping jaws 6 are pushed synchronously out of the pivoting ring 5 in the direction of the workpiece 7 and they consequently make a non-positive active contact with it, by means of which the workpiece 7 is centrally locked on the chuck body 2.

Figure 4A:
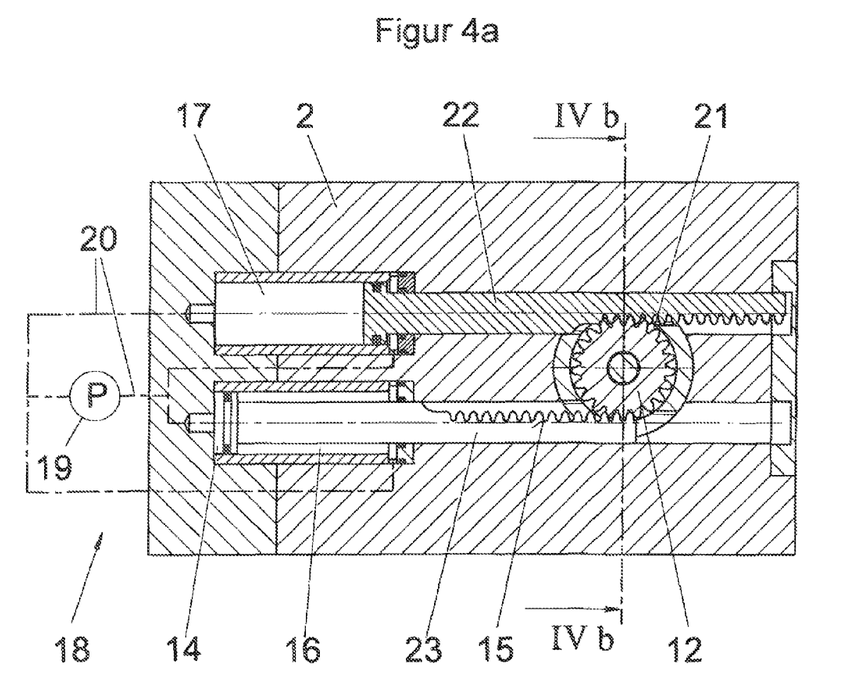
FIG. 4a shows the chuck according to FIG. 1 along the line IVa-IVa.
Figure 4B:
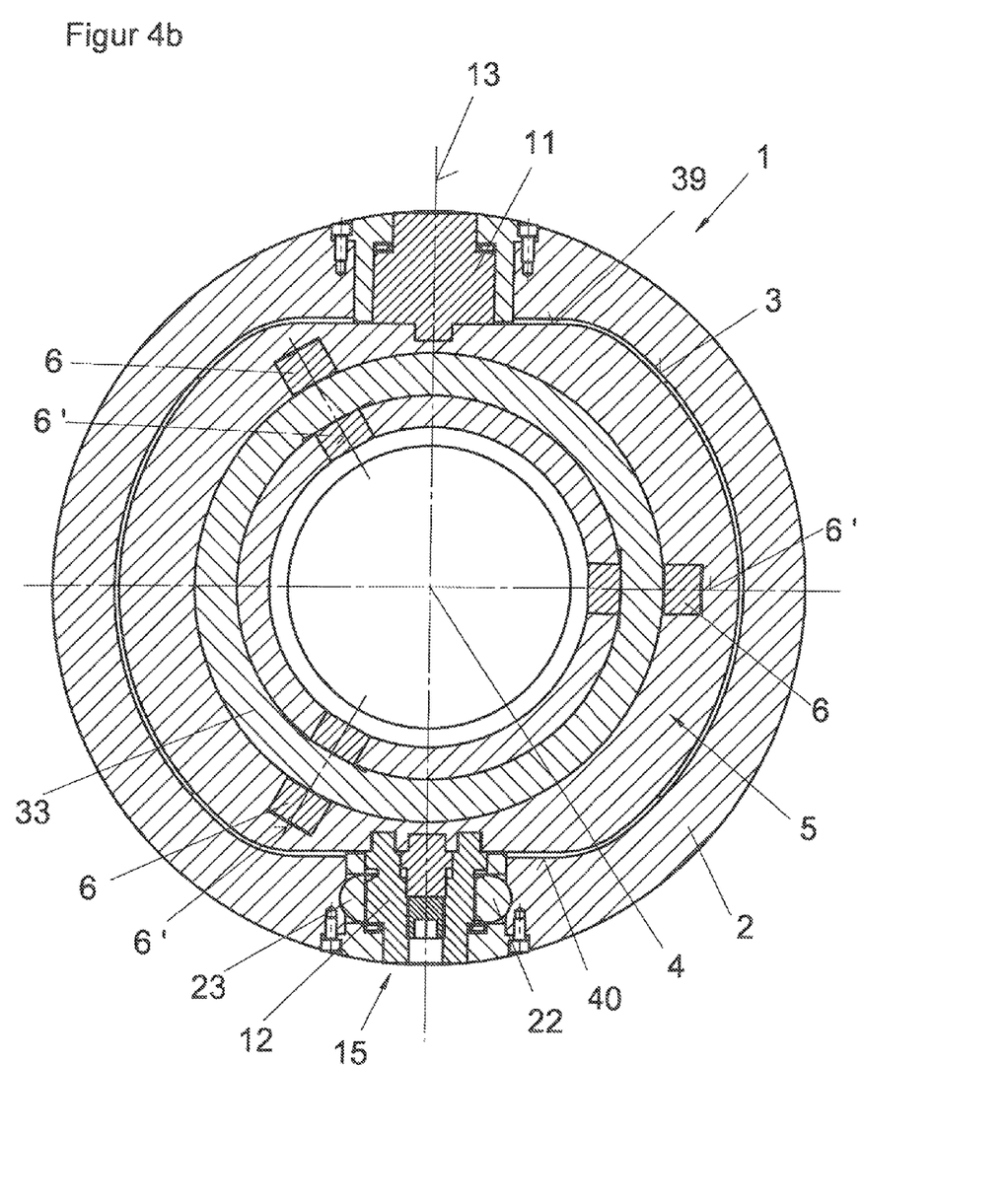
FIG. 4b shows the chuck according to FIG. 1 along the line IVb-IVb.

FIGS. 4a and 4b show the swiveling principle of the pivoting ring 5. One of the two pivot pins 11 or 12 that are opposite to one another are in a non-positive active connection with a drive piston 14 in this case. The drive piston 14 drives the pivot pin 12 via an intermediate element 15 in the illustrated sample embodiment, as is explained below in more detail. The piston 14 and the intermediate element 15 can also be linked with the pivot pin 11 in a driving connection. It is also possible for both pivot pins 11 and 12 to be driven synchronously, i.e. at the same time, with the effect that in that case two pistons 14 and two intermediate elements 15 must be provided for each of the two pivot pins 11, 12. FIGS. 4a and 4b additionally show that the drive piston 14 separates two pressure chambers 16 and 17 worked into the chuck body 2 from one another. The two pressure chambers 16 and 17 are connected together via control lines 18. A pump 19 is provided in the control line 18 by means of which a medium, such as a hydraulic fluid or a gas, is pumped in alternating directions so that the drive piston 14 can be moved back and forth between the two pressure chambers 16, 17, and thus performs a linear movement.

The drive piston 14 is in a driving connection with the pivot pin 12 via the intermediate element 15. An external splined profile 21 is worked onto the out jacket surface of the pivot pin 12.

The intermediate element 15 consists of two racks 22 and 23 running parallel with one another, with their respective rack profiles facing one another; the two racks 22, 23 form a fork or a U-profile in this case. The splined profile 21 of the pivot pin 12 is arranged between the two racks 22, 23. The rack profiles of the racks 22, 23 engage in the external splines 21 of the pivot pin 12, with the effect that a permanent, positive or driving active connection exists between the pivot pin 12 and the intermediate element 15.

In this case, the intermediate element 15 can also be configured in the form of a V-belt or chain drive, or also in the form of a threaded spindle.

The two racks 22, 23 run parallel with the longitudinal axis 4, with the effect that their structural space extends in this direction in order to take up as little space as possible, thereby allowing the external circumference of the chuck body 2 to have small dimensions.

As soon as the drive piston 14 is moved back and forth by the pump 19, consequently, the pivot pin 12 pivots in the corresponding direction of rotation. In this case, the length of the racks 22 is selected so that the pivot pin 12 undergoes a pivoting movement through 180° in a first direction of rotation. When the piston 14 and the racks 22 move back, the pivot pin 12 rotates in the opposite direction.

When the pivot pin 12 is pivoted by the drive piston 14 through 180° in one direction of rotation and then back in the opposite direction, the opposite pivot pin 11 rotates as well. This is because it is connected to the pivot pin 12 via the pivoting ring 5.

Figure 6:
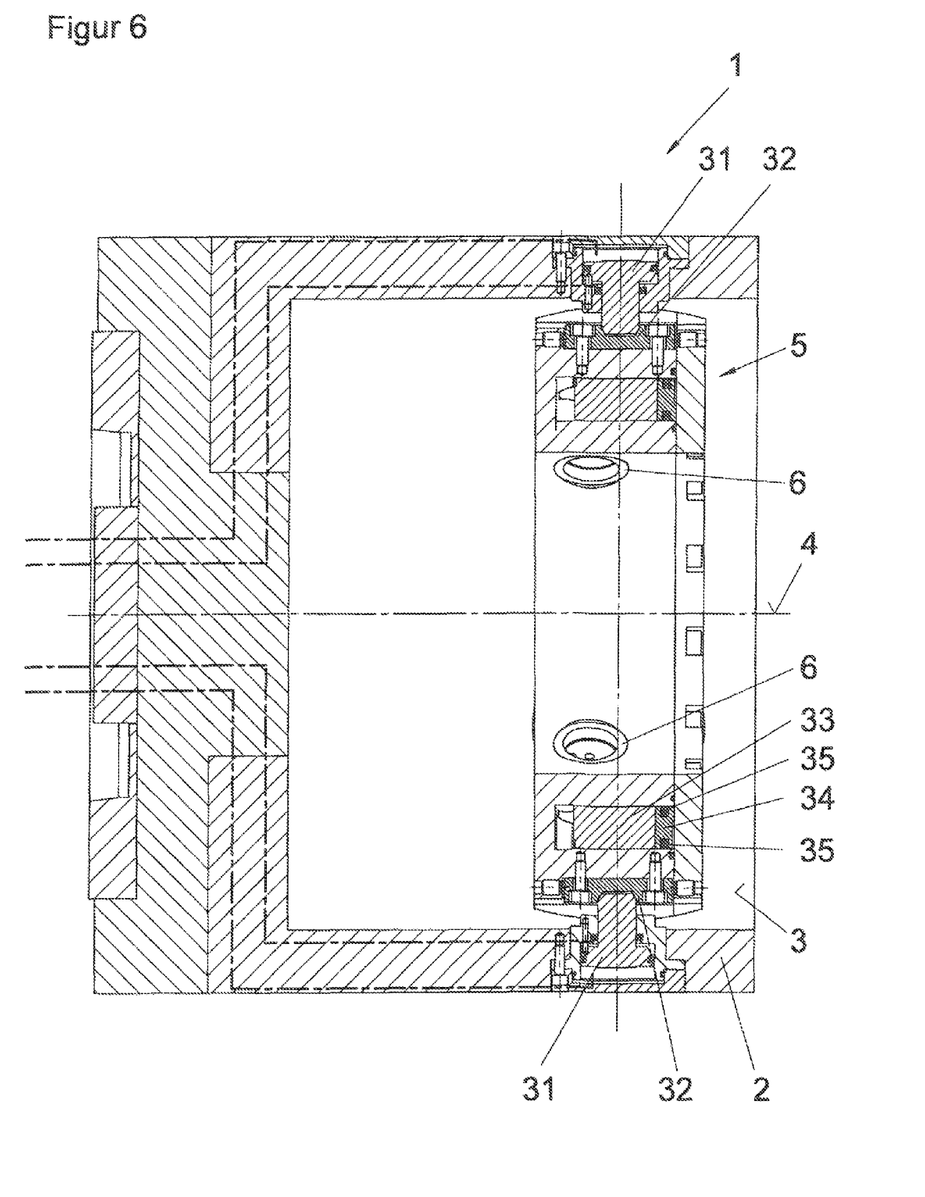

FIG. 6 shows that the pivoting ring 5 is supported on the chuck body 2 by means of two holding pins 31 that are arranged opposite one another and form a pair. The two holding pins 31 create a fixation axis 31' running at a distance from the pivot axis 13 and each of the clamping axes 6' formed by the clamping jaws 6. In the sample embodiment illustrated, the angular distance between the fixation axis 31' and the pivot axis 13 is 115°. The holding pins 31 are mounted in the chuck body 2 so they can be moved radially, and can be advanced in the direction of the pivoting ring 5. Two openings 32 are worked into the outer jacket surface of the pivoting ring 5 in the area of the holding pins 31, the internal contour of which openings 32 is adapted to the external contour of the holding pins 31 with the effect that the holding pins 31 engage in the openings 32 running in alignment with them during the machining process of the workpiece 7, so that the position of the holding pin 31 can be ascertained using a monitoring device and, depending on its position, the movement of the piston 14 is enabled or blocked.

As soon as the holding pins 31 engage in the corresponding opening 32, the pivoting ring 5 is additionally supported in the direction of rotation on the chuck body 2. Moreover, a plane surface 40 is worked onto the inner wall of the accommodating opening 3 of the chuck body 2. The outer jacket surface of the pivoting ring 5 has a contact surface 39 provided on it which, when the pivoting ring 5 is assembled, is aligned flush with the plane surface 40 of the accommodating opening 3. The contact surface 39 and the plane surface 40 run at right angles to the pivot axis 13, as a result of which the pivoting ring 5 can be pivoted parallel to the plane surface 40. The contact surface 39 of the pivoting ring 5 and the plane surface 40 of the accommodating opening 3 prevent pivoting of the pivoting ring 5 during the rotation of the chuck body 2, with the effect that the rotational forces of the chuck body 2 are transferred via the holding pins 31 as well as the openings 32 onto the contact surface 39.

The invention claimed is:

1. An indexing chuck (1) comprising:
a chuck body (2) in which an accommodating opening (3) with a ring-shaped design is worked into the chuck body (2) and runs centrally in relation to the longitudinal axis (4) of the chuck body;
a pivoting ring (5) inserted in the accommodating opening (3) of the chuck body (2), the pivoting ring (5) comprising at least three clamping jaws (6) that can be advanced radially, perpendicular to the longitudinal axis (4) of the chuck body (2), by means of which a rotationally symmetrical workpiece (7) to be machined is locked in the chuck body (2) centrally in relation to the longitudinal axis (4) of the chuck body;
an advancing device (8) which can be inserted into the pivoting ring (5), and by means of which the at least three clamping jaws (6) can be moved synchronously;
two pivot pins (11, 12) which are supported in the chuck body (2) and which form a pivot axis (13), the two pivot pins being in either a non-positive or positive active connection with the pivoting ring (5); and
at least one driving means in a driving connection with at least one of the pivot pins;
wherein the advancing device comprises a synchronising ring which is supported so as to be movable parallel to the longitudinal axis of the chuck body in the pivoting ring, the synchronising ring comprising a driving surface extending at an angle to the longitudinal axis of the chuck body in the region of the at least three clamping jaws, and wherein each of the at least three clamping jaws comprises a contact surface for engaging the driving surface of the synchronising ring such that the at least three clamping jaws are moved radially out of the pivoting ring when the synchronizing ring is moved parallel to the longitudinal axis of the chuck body such that the driving surface of the synchronizing ring contacts the contact surfaces of the at least three clamping jaws;
characterised in that the clamping axes (6') of the at least three clamping jaws (6) are disposed in a first plane, and the pivot axis (13) formed by the pivot pins (11, 12) is disposed in a second plane, wherein the first plane is longitudinally offset from the second plane along the longitudinal axis of the chuck body.

2. The chuck in accordance with claim 1, characterised in that the pivot pins (11, 12) are jointly pivoted through a 180 degree angle of rotation (α), by at least one drive piston (14), wherein the at least one drive piston (14) is configured to be an axially movable piston (14) disposed in the chuck body (2), wherein one of the two pivot pins (11 or 12) is in a drivable active connection with the at least one drive piston (14) via an intermediate element (15, 22, 23), wherein each of the at least one drive pistons (14) separates two pressure chambers (16, 17) from one another and the at least one drive pistons (14) are moved back and forth by means of a pump (19) which pumps a medium alternately into the pressure chambers (16, 17).

3. The chuck in accordance with claim 2, characterised in that the intermediate element (15) is configured as two racks (22, 23) running parallel to one another with the shape of a fork or a U-section, wherein the racks (22, 23) each have their toothed profiles pointing towards one of the at least two pivot pins (11 or 12), and are in a driving connection with the latter.

4. The chuck in accordance with claim 2, characterised in that the at least one drive piston (14) is aligned parallel to the longitudinal axis (4) of the chuck body (2).

5. The chuck in accordance with claim 1, characterised in that two holding pins (31) are mounted in the chuck body (2) so as to be radially movable, wherein the fixation axis (31') formed by the holding pins (31) is at a distance from the pivot axis (13) and the clamping axes (6') formed by the at least three clamping jaws (6), at an angle of 115° in relation to the pivot axis (13).

6. The chuck in accordance with claim 5, characterised in that two pairs of openings (32) are worked into the pivoting ring (5), such that the two pairs of openings are aligned in the direction of the chuck body (2), and such that in the locking position, each of the holding pins (31) engage in one of the pairs of openings (32).

7. The chuck in accordance with claim 6, characterised in that the position of each of the holding pins (31) can be established using an electric and/or mechanical monitoring device, such that depending on the position of the holding pins (31), the movements of the driving means (14) are enabled or blocked.

8. The chuck in accordance with claim 1, characterised in that the synchronising ring (33) is arranged in a hydraulic or pneumatic circuit (38) and that the synchronising ring (33) has a medium applied to it in alternating directions for axial movement.

9. The chuck in accordance with claim 1, characterised in that the chuck body (2) rotates about the longitudinal axis (4) in the operating condition, and that the rotational movements of the chuck body (2) are transferred to the pivoting ring (5).

10. The chuck in accordance with claim 1, characterised in that two contact surfaces (39) located opposite one another are worked onto the pivoting ring (5) and that the accommodating opening (3) of the chuck body (2) has two plane surfaces (40) that run flush with the contact surface (39) of the pivoting ring (5) in the assembled condition.

11. The chuck in accordance with claim 10, characterised in that the contact surface (39) of the pivoting ring (5) and the plane surface (40) of the accommodating opening (3) of the chuck (2) are aligned at right angles to the pivot axis (13) of the pivot pins (11, 12).

* * * * *